(No Model.)　　　　　　　　　　　　　　　　2 Sheets—Sheet 1.
C. J. REED.
CONDUIT ELECTRIC RAILWAY.

No. 521,892.　　　　　　　　　　　Patented June 26, 1894.

Witnesses
C. E. Ashley
H. W. Lloyd

Inventor
By his Attorney Charles J. Reed
Charles J. Kintner

THE NATIONAL LITHOGRAPHING COMPANY,
WASHINGTON, D. C.

(No Model.) 2 Sheets—Sheet 2.
C. J. REED.
CONDUIT ELECTRIC RAILWAY.
No. 521,892. Patented June 26, 1894.
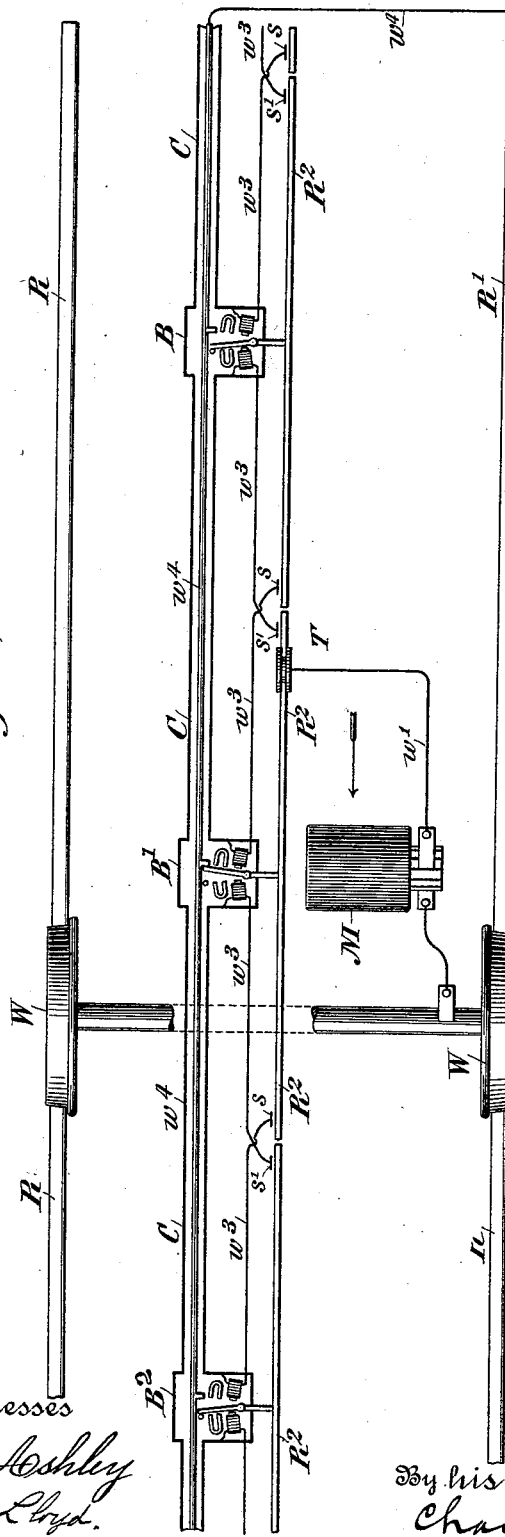
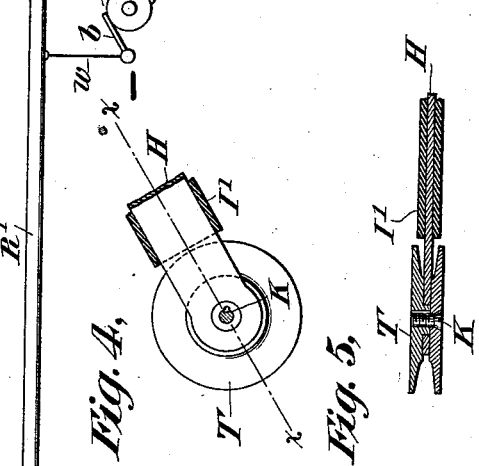
Witnesses
C. E. Ashley
I. W. Lloyd
Inventor
Charles J. Reed
By his Attorney Charles J. Kintner

UNITED STATES PATENT OFFICE.

CHARLES J. REED, OF ORANGE, NEW JERSEY, ASSIGNOR TO THE REED ELECTRIC COMPANY, OF PHILADELPHIA, PENNSYLVANIA.

CONDUIT ELECTRIC RAILWAY.

SPECIFICATION forming part of Letters Patent No. 521,892, dated June 26, 1894.

Application filed February 13, 1893. Serial No. 462,078. (No model.)

*To all whom it may concern:*

Be it known that I, CHARLES J. REED, a citizen of the United States, residing at Orange, in the county of Essex and State of New Jersey, have made a new and useful Improvement in Electric Railways, of which the following is a specification.

My invention is directed particularly to improvements in that type of electric railways known in the art as conduit systems in which the electrical current for propelling or moving the cars is conducted through one or more buried current mains located parallel with the road-bed and insulated throughout the entire length thereof, normally open short branch circuits being situated at intervals, said branch circuits being connected to sectional trolley conductors located in a slitted conduit and provided with switching mechanism for connecting the sectional trolley conductors and the branches to the current main or mains and disconnecting the same therefrom in sequence as a car passes over the route.

My invention will be fully understood by referring to the accompanying drawings, in which—

Figure 1:
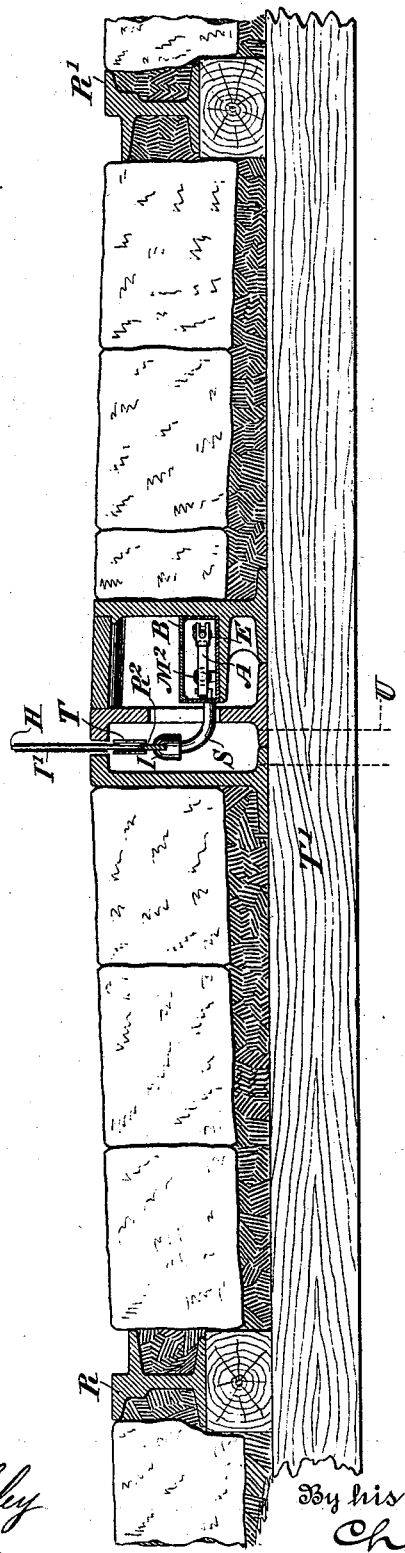
Figure 6:
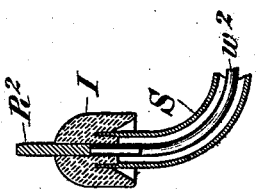

Figure 1 is a cross sectional view taken through the road-bed of an electric railway equipped with my improvement. Fig. 2 is a part plan, part diagrammatic view of the entire system. Fig. 3 is an enlarged, part plan, part horizontal sectional view illustrating the interior mechanism of the sectional switch boxes and circuit connections with the current main and branches and sectional trolley conductors. Fig. 4 is a side elevational view of my improved trolley for use in connection with slitted conduits, and Fig. 5 is a horizontal sectional view of the same taken on line $x$—$x$, Fig. 4. Fig. 6 is a detail sectional view through one of the supporting arms of the conducting trolley sections illustrating also a trolley section in cross sectional view and one of the branch conductors connected thereto.

Referring now to the drawings in detail and first to Fig. 1 thereof, R and R' are the rails of an ordinary tram-way resting upon longitudinal sleepers buried in the road-bed and in turn supported by cross sleepers T' upon which is sustained, in the center of the road-way, a two-part slitted conduit, to which at intervals of from fifty to one hundred feet or of such lengths as may suggest themselves to the builder, are attached water tight switch boxes B, C being a water tight conduit connected also to the switch boxes and inclosing a continuously insulated main or lead $w^4$ (see Fig. 2) said main or lead being connected at one end by one of the commutator brushes $b$ $b$ to a dynamo D located at the power station, the other pole of the dynamo being connected either to a similar buried conductor with like connections or directly to one of the rails R'.

W, W represent the wheels of a tram-car resting upon the rails R R'.

M is an electric motor carried by the car and adapted to propel it in the usual well known manner, said motor being connected electrically through the wheel W with the rail R' and by a conductor $w'$ with a trolley T adapted to move in a slit in the conduit and rest upon the conducting sectional trolley conductors $R^2$, $R^2$, &c., which are normally electrically disconnected from the insulated current main or lead. The sectional trolley conductors $R^2$ are supported at intervals by standards S having glass or other well known insulating heads I.

$w^3$, $w^3$, $w^3$ are insulated sectional conductors connected at their outer ends to contact springs $s$ $s'$ located at the ends of the conducting trolley sections but normally disconnected therefrom and at their inner ends permanently connected to the metallic conduit C, said springs lying in close proximity to the sectional trolley conductors $R^2$ so that when the trolley wheel T passes from one section to the next in advance it will unite the ends thereof metallically to the end of the trolley section on which it rests.

M' and $M^2$ are switching electro-magnets located inside of the switch boxes B, B', $B^2$, &c., and in circuit with the conductors $w^3$ $w^3$, said magnets being situated in each instance, as clearly shown, on opposite sides of a conducting switching armature A pivoted at one end inside of the switch box, its free end being adapted to make electrical contact with a conducting arm E which in turn has electrical contact with the insulated main or lead $w^4$.

P is a back stop for maintaining the armature A in its open position as shown in dotted lines in Fig. 3.

$M^3$ and $M^4$ are permanent magnets of sufficient magnetic capacity to hold the armature A in its forward or backward position, said magnets however not being sufficiently close to the armature to permit of actual contact therewith. Each of the sectional trolley conductors $R^2$ is directly connected by a conductor $w^2$ running through the standard S with the pivoted end of the armature lever A in its switch box B.

It will be observed that the conductors $w^3$ run in pairs in opposite directions from the junction of each succeeding pair of trolley conductors $R^2$ $R^2$ to the switch boxes located at the middle of the sections and through electro-magnets $M'$ and $M^2$ located on the opposite sides of the armature levers A, the arrangement being such that the electro-magnet $M'$ in the next succeeding section in advance is energized and caused to draw the armature lever A into contact with the conducting arm E just before the electro-magnet $M^2$ in the rear switch box is energized and caused to tilt the armature A in that box against the back stop P and out of contact with the conducting arm E.

My improved form of trolley shown in Fig. 4 is designed especially for use in slitted conduits and is so constructed as to be of the least lateral dimensions, thereby admitting of the use of a slit of very narrow width. The trolley arm H is made of conducting material and provided with an opening at its lower end into which the trolley T is journaled. This trolley is made of two parts of conducting material, one of which is provided with an inwardly extending boss or projection which acts as the axle and fits in the opening in the lower end of the trolley-arm, the length of this boss or axle being sufficient to allow the necessary freedom of movement when the two-part trolley wheel T is held together by a screw K, as clearly shown in Fig. 5. The trolley arm H is surrounded with insulating material $I^2$ preferably in the manner that glazed coating is put upon metal ware and the entire width of the trolley and trolley arm is substantially the same so as to permit of their being easily lifted out of the slitted conduit when desired.

The operation of the apparatus is as follows: Suppose a car to be moving in the direction of the arrow, see Fig. 2. The current then is passing from the + pole of the dynamo D by brush $b$, insulated main or lead $w^4$ located in the metallic conduit C to the arm E in switch box $B'$ (see Figs. 2 and 3), thence through the armature lever A which is now resting with its free end in contact with the arm E, thence through the branch conductor $w^2$ (see Fig. 6) to the sectional trolley conductor $R^2$, thence through the trolley T, conductor $w'$, propelling motor M, axle of the car and car wheel W, by the rail $R'$ and conductor $w$ back to the starting point. The car therefore proceeds in the direction indicated until it reaches the end of the next section in advance, when the trolley T in passing off of the sectional trolley conductor $R^2$ closes a derived circuit between said sectional trolley conductor and the contact spring $s$, through the conductor $w^3$, electro-magnet $M'$ in the switch box $B^2$, thence through the conducting conduit C which is in contact with the earth back through the earth, the rail $R'$ and conductor $w$ to the − pole of the dynamo. This derived current therefore actuates the armature switch lever A in the switch box $B^2$ and brings its free end into contact with the arm E (see Fig. 2) in the box $B^2$ of the next sectional trolley conductor in advance. At the next instant the trolley passes on to this sectional trolley conductor breaking the derived circuit through the conductor $w^3$ running from the contact spring $s$ to the electro-magnet $M'$ in the switch box $B^2$ in advance and establishes a new derived circuit from the new sectional trolley conductor on which it is now passing, through the spring $s'$, conductor $w^3$ running to the rear and through the electro-magnet $M^2$ in the switch box $B'$ to the conducting conduit C back through the earth and rail $R'$, conductor $w$ to the − pole of the generator, thereby actuating the armature switch lever A in the switch box $B'$ just passed therefore disconnecting the circuit between the main or lead $w^4$ at that point, leaving the motor now under the control of the sectional trolley conductor upon which the car has just passed.

It will be apparent on inspection of the drawings and in view of the description of the mode of operation just made that the switch or armature levers A in the successive switch boxes B, $B'$, $B^2$, &c., can only be operated in succession and in the order enumerated, that is to say, each switch which connects the insulated current main or lead with the next conducting trolley section in advance will be actuated just before leaving or passing off from the conducting trolley section over which the car is passing and that section of trolley conductor will be immediately disconnected from the current main or lead at the next instant of time. Under no condition of affairs is it possible with this arrangement to flood the conduit and leave any of the sectional trolley conductors operatively connected with the current main or lead as it is obvious that should the conduit be flooded at the ends of several succeeding conducting trolley sections the moment the trolley enters the first one of those sections it will cause the flooded sections to be successively cut in and cut out in sequence until the switch last affected is beyond the flooded district. Nor is it possible for any person to actuate a switch at any part of the route by closing the circuit between the contact springs $s$ or $s'$ and any one of the adjacent sectional conductors $R^2$ except a car be over that portion of the route with its trolley in circuit therewith. In other words it requires the absolute presence of a car and trolley with its circuit connections to actuate the switches. It will be understood also by those skilled in the art that the necessary proportions of resistance should be placed in the derived circuits $w^3$ $w^3$ together with fusible cut outs, these attachments, such as are well known, being located preferably inside the switch boxes B, B', B², &c. The permanent magnets M³ M⁴ may also, if thought desirable, be provided with a few windings of insulated wire connected in derived circuit with the circuits $w^3$ for the purpose of maintaining the permanent magnetism constant in said magnets.

Should by any unforeseen accident a trolley at any time lose its current at any switch box the switch or armature lever A in the nearest box may be brought into contact with the arm E by any preferred means. Inasmuch as the switch boxes are all water tight I prefer to locate this switch arm or lever A in a horizontal position as near as possible to the upper sides of such boxes and to cover the boxes with non-magnetic material such as brass or copper. In this event should a trolley lose its current at any switch box I should prefer to restore the switch to operative relations with the contact arm E by using a permanent magnet of sufficient magnetic capacity to overcome the influence of the permanent magnets M⁴ which hold the switches or armature levers A in their open positions. In order to accomplish this the motor-man would simply be required to place the poles of a strong permanent magnet against the upper outside face of the switch box and draw it from left to right looking at Fig. 3, thereby causing the armature or switch lever A to be released from the influence of the permanent magnet M⁴ after which the car proceeds in the usual manner.

I do not limit myself to the special details of construction herein shown and described for accomplishing the results named as it is obvious that many of the details might be materially departed from and still embrace apparatus coming within the scope of my claims.

Having thus described my invention, what I claim, and desire to secure by Letters Patent of the United States, is—

1. In a system of electric railways a generator of electricity, an insulated current main connected thereto and having exposed contacts in switch boxes located at intervals throughout the route; sectional trolley conductors having normally open branch connections each with a switching device located in one of the switch boxes; a pair of electro-magnets in each switch box one of which has normally open circuit connections with the sectional conductor next in advance and the other similar normally open circuit connections with the sectional conductor next in the rear, in combination with a traveling trolley operatively connected with an electric motor carried by the car and adapted to close the circuit through one of the electro-magnets next in advance so as to connect the next succeeding sectional trolley conductor with the current main and then to close the circuit through one of the electro-magnets in the switch box last passed, whereby the sectional conductor last passed is disconnected substantially as described.

2. In a system of electric railways an insulated current main or lead having exposed contacts in switch boxes located at various points throughout the route; a normally disconnected sectional trolley conductor for each switch box; a pair of electro-magnets in each switch box one of which is provided with normally open circuit connections for connecting it electrically with the front end of one of the sectional trolley conductors the other being provided with similar circuit connections for connecting it with the rear end of the next sectional trolley conductor in advance, and circuit connections through a traveling trolley, whereby the sectional trolley conductors are successively cut into and out of circuit as the car advances substantially as described.

3. In a system of electric railways an insulated current main; a series of sectional trolley conductors; an insulated branch conductor running from each trolley conductor into a water tight switch box and connected to a switching device controlled in its movements by two electro-magnets, the contacting portion of said switching device lying in the path of a fixed contact connected to the insulated current main, said electro-magnets being located in normally open branch circuits running respectively to the adjacent ends of the two trolley conductors next in advance and in the rear, in combination with a traveling trolley carried by a moving car or vehicle and adapted to close the circuit between the trolley conductors and the aforesaid normally open branch circuits as the car advances, substantially as described.

4. A trolley consisting of a two-part trolley wheel, one of which parts is provided with an inwardly extending boss or projection which constitutes the axle of the trolley, in combination with a trolley arm journaled upon the axle and held between the two parts, substantially as described.

5. A trolley consisting of a two-part trolley wheel, one of which parts is provided with an inwardly extending boss or projection constituting the axle of the trolley, in combination with a trolley arm located between the two parts of the wheel and means for holding the parts together, substantially as described.

6. A trolley consisting of a two-part trolley wheel, one of which parts is provided with an inwardly extending boss or projection constituting the axle of the trolley, the inner face of the other part resting thereon, the parts being held together by a screw, in combination with a trolley arm located between the two parts, the upper portion of said trolley arm being surrounded by insulating material, substantially as described.

7. A trolley consisting of a two-part trolley wheel, one of which parts is provided with an inwardly extending boss or projection constituting the axle of the trolley, the other part being held thereto by a screw, in combination with a trolley arm journaled on the axle between the two parts and surrounded above the trolley wheel by a glazed coating of insulating material, substantially as described.

8. In an electric railway system an insulated current feeder or main having circuit connection through an exposed contact inclosed in a water tight switch box with a magnetic switching lever electrically connected with an exposed trolley conductor, said lever lying in close proximity to a non-magnetic box cover, in combination with a portable magnet adapted to actuate the switching lever through the cover, and additional permanent magnets adapted to hold or secure the switching lever in either of two positions, substantially as described.

In testimony whereof I have hereunto subscribed my name this 10th day of February, 1893.

CHARLES J. REED.

Witnesses:
CHARLES J. KINTNER,
M. M. ROBINSON.